G. H. GILMAN.
STONEWORKING MACHINE.
APPLICATION FILED JULY 21, 1908.
1,164,083.
Patented Dec. 14, 1915.
2 SHEETS—SHEET 2.
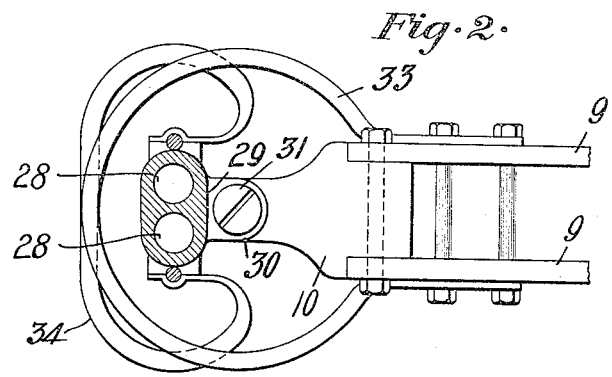
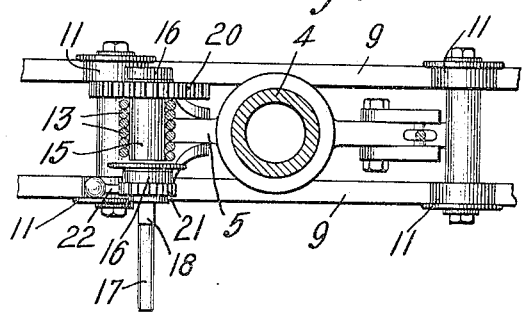
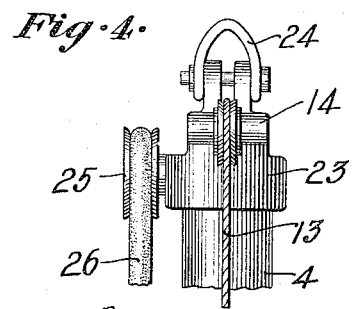
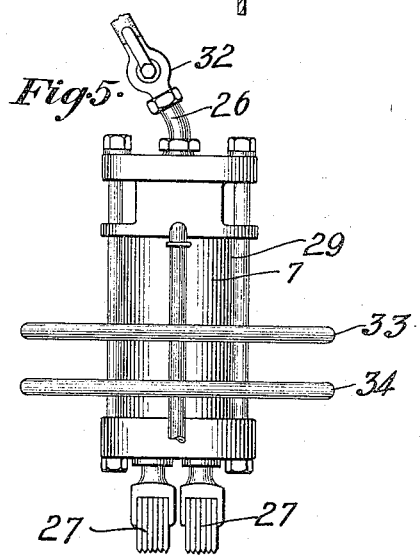
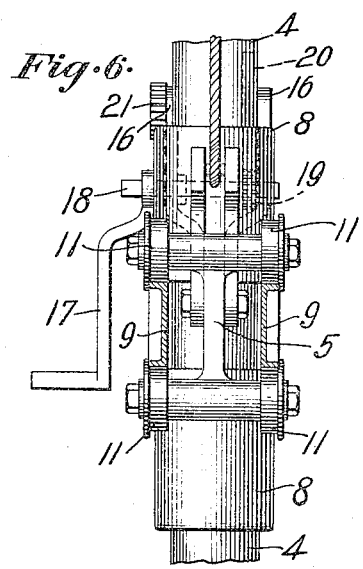
Witnesses:
Horace H. Crossman
Walter L. Prince
Inventor:
George H. Gilman,
by Emery & Booth,
Attys.

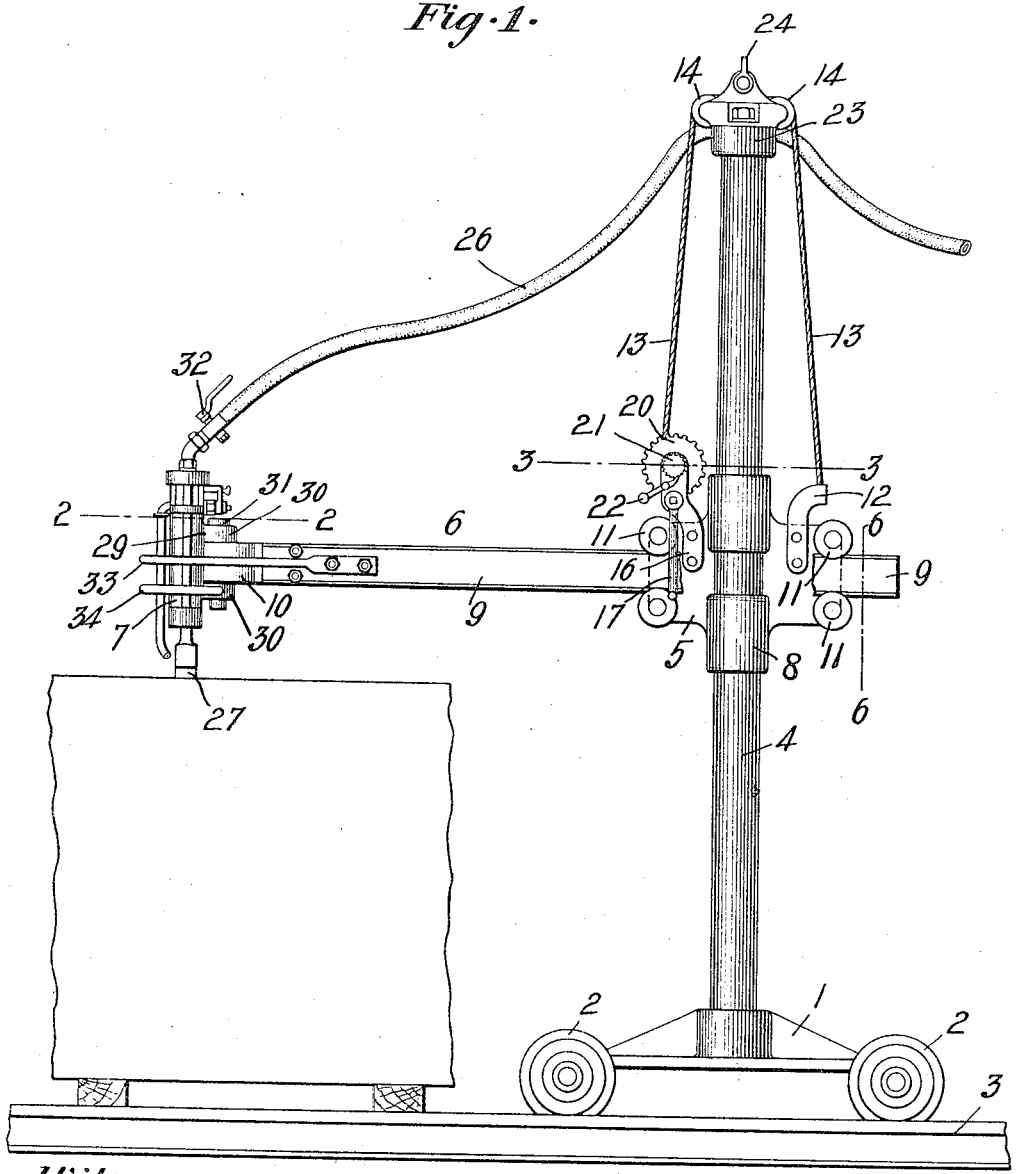

UNITED STATES PATENT OFFICE.

GEORGE H. GILMAN, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

STONEWORKING-MACHINE.

1,164,083.      Specification of Letters Patent.      Patented Dec. 14, 1915.

Application filed July 21, 1908. Serial No. 444,621.

*To all whom it may concern:*

Be it known that I, GEORGE H. GILMAN, a citizen of the United States, residing at Claremont, in the county of Sullivan, State of New Hampshire, have invented an Improvement in Stoneworking-Machines, of which the following description, in connection with the accompanying drawings, is a specification, like letters on the drawings representing like parts.

This invention relates to stone working machines, the embodiment herein shown being intended more particularly for the dressing or surfacing of stone.

The invention will be best understood by reference to the following description when taken in connection with the accompanying illustration of one specific embodiment thereof, while its scope will be more particularly pointed out in the appended claim.

In the drawings: Figure 1 is a side elevation of a surfacing machine embodying one form of my invention; Fig. 2 is a horizontal section in plan on the line 2—2 of Fig. 1, the larger portion of the machine being broken away. Fig. 3 is a similar section on the line 3—3 in Fig. 1; Fig. 4 is a side elevation of the cap at the top of the central column at right angles to the view shown in Fig. 1; Fig. 5 is an end elevation of the tool carrier and tools; and Fig. 6 is a vertical section taken on the line 6—6 of Fig. 1 and looking toward the left of said view.

Referring to the drawings and to the particular embodiment of my invention there shown, the machine is mounted upon any suitable support, the latter herein comprising a portable base or truck 1, mounted upon wheels 2, upon which the apparatus may move along the track 3.

In the form herein illustrated, the base is provided with an upright central support, herein a column 4 fixedly secured upon the base. This column sustains and guides a main supporting carriage 5, which is free to be adjusted vertically and to be moved rotatably with respect to said column at the will of the operator and in a manner more fully hereinafter described.

The carriage supports the laterally extending tool-carrying member, herein in the form of a radial arm 6, near the outer end of which is supported the main surfacing or dressing tool 7. In the present machine the construction of the parts are such that the radial arm may be raised or lowered to adjust the vertical position of the arm and tool, or its effective length may be increased or diminished relatively to the standard while, at the same time, the tool may be swung about the supporting standard in the arc of a circle, as requirements of the work may demand.

Although the swinging adjustment of the tool about the central support may be obtained in other ways, in the present construction the main supporting carriage 5 is mounted so that it can both turn about and move vertically up and down the column 4. For this purpose the carriage 5 (Fig. 1) is provided with separate superposed sleeve portions 8 which embrace the column 4 with sufficient clearance so that the carriage may turn freely about the same or move freely up and down, but sufficiently close to maintain the arm 6 substantially firm and rigid.

The radial supporting arm herein consists (Figs. 2, 3 and 6) of a frame-work composed of two parallel spaced members 9, herein in the form of channel irons, embracing the column 4 and held in their spaced relation at each end by suitable spacing blocks, one of which 10 is shown at the outer or working end of the arm 6.

In order to permit the operator freely to move the arm in a radial direction during the operation of the machine, each channel iron is confined between pairs of upper and lower flanged guiding rollers 11, the latter engaging both above and below on vertically opposite sides of the channel irons. The distance between the rollers is such that, while the arm is fixedly and rigidly held in the desired horizontal position upon the carriage, it may be slid radially or longitudinally with reference to the supporting column at will upon the roller bearing supports thus afforded.

To permit the operator to adjust the arm and tool vertically there is attached to the carriage 5, as to the bracket 12 fast thereon, a flexible member such as the wire cable 13, the latter passing up over sheaves 14 at the top of the column and thence downward to a winding drum 15 mounted on the carriage. The winding drum 15 is mounted in bearings formed in the brackets 16 and may be turned by a handle 17 to wind or unwind the cable on the drum and raise or lower the arm. To this end the handle 17 is attached to the end of a shaft 18, said shaft carrying a pinion 19 meshing with a gear 20, the latter mounted on the end drum shaft. To the opposite end of the drum shaft is keyed a ratchet wheel 21 adapted to be engaged by the weighted pawl 22 and thereby held in any desired position.

At the top of the column the guiding sheaves 14 are journaled upon a crown piece 23, the latter revolubly and preferably mounted upon ball bearings. The crown piece is, therefore, free to turn and adjust itself about the axis of the column in response to the swinging adjustment of the radial supporting arm and such swinging adjustment may be effected by the operator by merely pulling the arm toward him or pushing the same away from him. The crown piece 23 is preferably provided with an eye 24 pivotally secured to the top of the same, so that the entire machine may be lifted about from one point to another by suitable hoisting mechanism.

At the side of the crown piece and parallel with the sheaves 14 is preferably provided the sheave 25 journaled upon a stud secured to the crown piece, which sheave is deeply grooved so as to be capable of guiding and receiving the hose 26 used to convey the pressure fluid to the working tool.

In the illustrated form of machine I have provided a plurality (herein two) of cutting units each comprising a cutting tool or set of tools 27 and separate tool-actuating units 28, the latter herein consisting of pressure fluid-actuated percussive tools of the reciprocating hammer type, each with its piston hammer adapted to deliver a series of blows to the bit or support carrying the associated cutting tool or tools. Preferably these tools are constructed so as to operate independently so that they will not necessarily work simultaneously in the same direction. This may be accomplished in other ways, but by simply making the two tools distinct and independent of each other, owing to ordinary differences such as care in manufacture, it would be only by the merest chance that both pistons would strike at precisely the same instant. By this means, the vibration set up by one piston would be, to a very large extent, offset or neutralized by that of the other, thereby reducing the shock and vibration at the end of the arm to a minimum. In the present case these cutting units are mounted upon the arm so as to have a longitudinally fixed or non-traveling relation thereto during the active operation of the machine. While to this end they might be mounted upon a carrier adjustable to different fixed positions along the arm, in the present case I have provided a tool support permanently fixed on the arm, and, for this purpose, make use of the spacing block 10 in the outer end of the arm. This block 10 acts as a tool support and is narrowed at its outer end and contains a vertical perforation. To this is secured a tool-carrying body 29 by means of horizontal ears 30 which are hinged to the block by means of a bolt 31 passing through the perforation on the said block and alined perforations in the said ears. This pivotal or hinged adjustment of the tool carrier 29 to the tool support 10 provides means for adjustably swinging the tool 7 and maintaining the resultant lines of cut of the different sets of tools in alinement, irrespective of the varying swinging adjustment of the arm, which, without some means of adjusting simultaneously and together either the tool carrier or the cutting tools themselves would produce a variation in the resultant lines of cut.

In the employment of this apparatus the operator, having vertically adjusted the main supporting carriage and the arm, can start both sets of tools in operation by admitting pressure fluid to the two piston hammer tools through the throttle valve 32. With the machine in operation he can swing the arm with the attached tools about the central support or move the arm longitudinally upon its supporting carriage, there being preferably provided for this purpose a grasping member on the arm to be grasped by the operator, such grasping member herein comprising a curved handle 33 bolted to opposite sides of the end of the arm 6 and having its curved portion encircling the tools. As the arm is swung about the support during the operation of the tool it becomes necessary to turn the tools together about their pivotal support, and, for this purpose, there is also provided immediately below the handle 33 a second grasping handle, the latter (Fig. 2) secured to the cylinder casting of the hammer tools, so that with one hand upon the handle 33 to swing the arm, the operator can grasp the tool handle 34 with the other hand and coöperatively turn the tools with their cutters to correspond. These handles, as shown, preferably extend outwardly beyond the end of the tool to afford a convenient control by the operator of the main arm 6 and the auxiliary arm or tool carrier 29.

Although the tools might be mounted for vertical independent turning movement preferably, as shown, they are mounted in the same casing and upon the same support 29 in fixed relation to each other so as to turn together when the tool-carrier 29 is turned.

While I have herein shown and described one form of my invention for purposes of illustration, it will be understood that the invention is not limited either to the particular application thereof herein made, or to the construction and details shown, but that various modifications can be made therein without departing from the spirit and scope of my invention.

I claim:

In a stone surfacing machine, an upright central support, a laterally extending arm radially and vertically movable on said support, tool-carrying means pivoted vertically at an end of said arm, a plurality of independently operated, percussive, cutting tools mounted in said means, and superposed handles on said arm and said means for controlling their respective movements.

In testimony whereof, I have signed my name to this specification, in the presence of two subscribing witnesses.

GEORGE H. GILMAN.

Witnesses:
E. J. BURCHARD,
J. A. BRUCE.